United States Patent
Sakai et al.

(10) Patent No.: US 9,684,969 B2
(45) Date of Patent: Jun. 20, 2017

(54) COMPUTER-READABLE RECORDING MEDIUM, DETECTING METHOD, AND DETECTING APPARATUS DETECTING AN AMOUNT OF IMAGE DIFFERENCE

(71) Applicant: FUJITSU LIMITED, Kawasaki-shi, Kanagawa (JP)

(72) Inventors: Miho Sakai, Yokohama (JP); Atsushi Oguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/574,509

(22) Filed: Dec. 18, 2014

(65) Prior Publication Data
US 2015/0193670 A1    Jul. 9, 2015

(30) Foreign Application Priority Data

Jan. 7, 2014   (JP) ................................ 2014-001229

(51) Int. Cl.
  G06K 9/46   (2006.01)
  G06T 7/20   (2017.01)
  G06K 9/00   (2006.01)
(52) U.S. Cl.
  CPC ............ *G06T 7/20* (2013.01); *G06K 9/00335* (2013.01); *G06T 2207/30221* (2013.01)
(58) Field of Classification Search
  None
  See application file for complete search history.

(56) References Cited

U.S. PATENT DOCUMENTS

| 6,985,172 B1* | 1/2006 | Rigney .............. G06K 9/00335 348/149 |
| 8,175,356 B2* | 5/2012 | Movassaghi ........... A61B 6/504 382/128 |
| 2013/0034272 A1* | 2/2013 | Thomas ................ G06T 7/0016 382/107 |
| 2013/0194182 A1 | 8/2013 | Tarama et al. |

FOREIGN PATENT DOCUMENTS

| JP | 2012-73935 | 4/2012 |
| JP | 2013-116311 | 6/2013 |
| JP | 2013-154123 | 8/2013 |
| JP | 2013-154125 | 8/2013 |
| KR | 10-2010-0121020 | 11/2010 |

OTHER PUBLICATIONS

Fujiyoshi et al., "Real-Time Human Motion Analysis by Image Skeletonization", IEICE Transactions on Information and Systems, vol. E87-D, No. 1, published Jan. 1, 2004, bib page and 6 pages of the article (7 pages total).*
Korean Office Action dated Jan. 28, 2016 in corresponding Korean Patent Application No. 10-2014-0185687.

* cited by examiner

*Primary Examiner* — Brian P Werner
(74) *Attorney, Agent, or Firm* — Staas & Halsey LLP

(57) ABSTRACT

A detection method by which a computer to execute the following processes: The detection program causes the computer to execute a process of detecting times at which a timelike change amount temporarily decreases in a plurality of images that are sequentially taken. The detection program also causes the computer to execute a process of extracting, on the basis of the detected times, either a movement of beating time of a person included in the taken images or times at which the person included in the taken images beats time.

5 Claims, 9 Drawing Sheets

| TIME | WHETHER OR NOT TIME IS BEATEN |
|---|---|
| 0.033 | YES |
| 0.066 | NO |
| ⋮ | ⋮ |

| FRAME NUMBER | BACKGROUND DIFFERENCE AMOUNT |
|---|---|
| FRAME 2 | 267000 |
| FRAME 3 | 266000 |
| ⋮ | ⋮ |

COMPUTER-READABLE RECORDING MEDIUM, DETECTING METHOD, AND DETECTING APPARATUS DETECTING AN AMOUNT OF IMAGE DIFFERENCE

CROSS-REFERENCE TO RELATED APPLICATION

This application is based upon and claims the benefit of priority of the prior Japanese Patent Application No. 2014-001229, filed on Jan. 7, 2014, the entire contents of which are incorporated herein by reference.

FIELD

The embodiment discussed herein is directed to a detection program, a detecting method, and a detecting apparatus.

BACKGROUND

Techniques for giving a score to a person's dance and informing the person of the scoring result are known.

Among techniques related to giving a score to or evaluating a person's dance, a technique is known by which, for example, a level of similarity between a detected posture of a game player and a sample posture is calculated, and if the level of similarity is higher than a predetermined value, an auxiliary image is generated to bring the game player's attention to details of the sample posture that are not similar.

Patent Document 1: Japanese Laid-open Patent Publication No. 2013-116311

To give a score to or evaluate a person's dance, it may be desirable to extract times at which the person beats rhythm, i.e., the person's movements of beating time or the times at which the person beats time. However, according to the technique described above, because the analysis involves a large amount of processing, a problem remains where there are some situations where it is not possible to easily extract the person's movements of beating time or the times at which the person beats time.

For example, to give a score to a person's dance, in one possible mode, the person's rhythm can be extracted by taking images of the person's movements with a camera and analyzing the taken moving images by using a computer. As for a specific method, for example, the face or a part of the body of the person or a tool (e.g., a maracas) used by the person is recognized from the moving images, by using a predetermined recognition technique such as template matching, so as to generate time-series data of movement amounts of the face, the part of the body, or the tool that was recognized. After that, a Fourier analysis or the like is performed on the time-series data, so as to extract the person's rhythm from the components in a specific frequency band. Subsequently, in one possible example, the extracted rhythm of the person is compared with a reference rhythm, so that a score is given to the person's dance according to the comparison result. According to the mode described above, however, for example, when the template matching process is performed to recognize, from the moving images, the face or the part of the body of the person or the tool such as a maracas used by the person, the process of comparing a template with a part of the moving images is repeatedly performed. For this reason, the analysis involves a large amount of processing, and a large processing load is imposed on the computer.

SUMMARY

According to an aspect of an embodiment, a detecting method includes detecting times at which a timelike change amount temporarily decreases in a plurality of images that were sequentially taken, and extracting, on a basis of the detected times, either a movement of beating time of a person included in the taken images or times at which the person included in the taken images beats time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. The present disclosure is not limited by the exemplary embodiments.

[An Exemplary Functional Configuration of a Detecting Apparatus According to an Embodiment]

Figure 1:
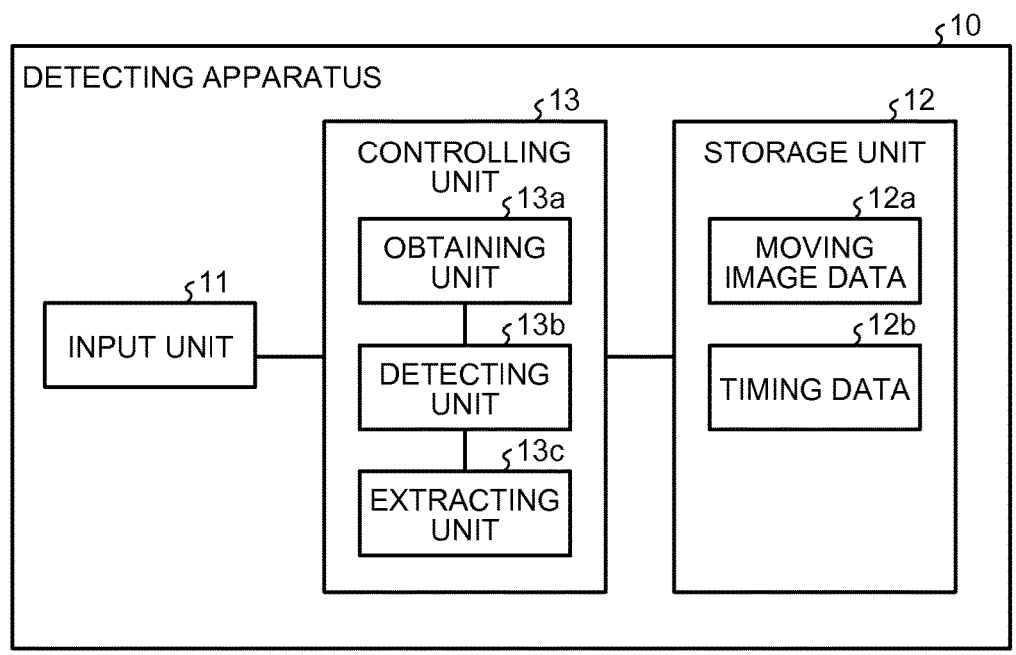
FIG. 1 is an exemplary diagram of a functional configuration of a detecting apparatus according to an embodiment.

A detecting apparatus 10 illustrated in FIG. 1 is configured to extract times at which a movement amount of a person temporarily decreases, as times at which the person beats rhythm i.e., as times at which the person beats time, from frames of moving images obtained as a result of taking images of the person who is dancing, by using a camera. The reason why the times at which the movement amount of the person temporarily decreases are extracted as the times at which the person beats time is because when the person beats time, the movement amount temporarily decreases due to the person temporarily stopping his/her movement. Accordingly, the detecting apparatus 10 is able to extract the times at which the person beats time, without performing any recognition process for recognizing the face or a part of the body of the person or a tool, i.e., without performing any recognition process that involves a large amount of processing (that has a large processing load). Consequently, by using the detecting apparatus 10, it is possible to easily extract the times at which the person beats time. In this situation, the "rhythm" denotes, for example, regularity of time intervals of a tempo. The "tempo" denotes, for example, the length of the time intervals such as the time beaten or the beats.

FIG. 1 is an exemplary diagram of a functional configuration of a detecting apparatus according to an embodiment. As illustrated in the example in FIG. 1, the detecting apparatus 10 includes an input unit 11, a storage unit 12, and a controlling unit 13.

The input unit 11 inputs various types of information to the controlling unit 13. For example, when having received an instruction from a user using the detecting apparatus 10, indicating that an extracting process described below be performed, the input unit 11 inputs the received instruction to the controlling unit 13. Examples of devices that can be used for configuring the input unit 11 include a mouse, a keyboard, and a network card configured to receive various types of information transmitted from another apparatus (not illustrated) and to input the received information to the controlling unit 13.

The storage unit 12 stores therein various types of information. For example, the storage unit 12 stores therein moving image data 12a and timing data 12b.

Figures 2, 3:
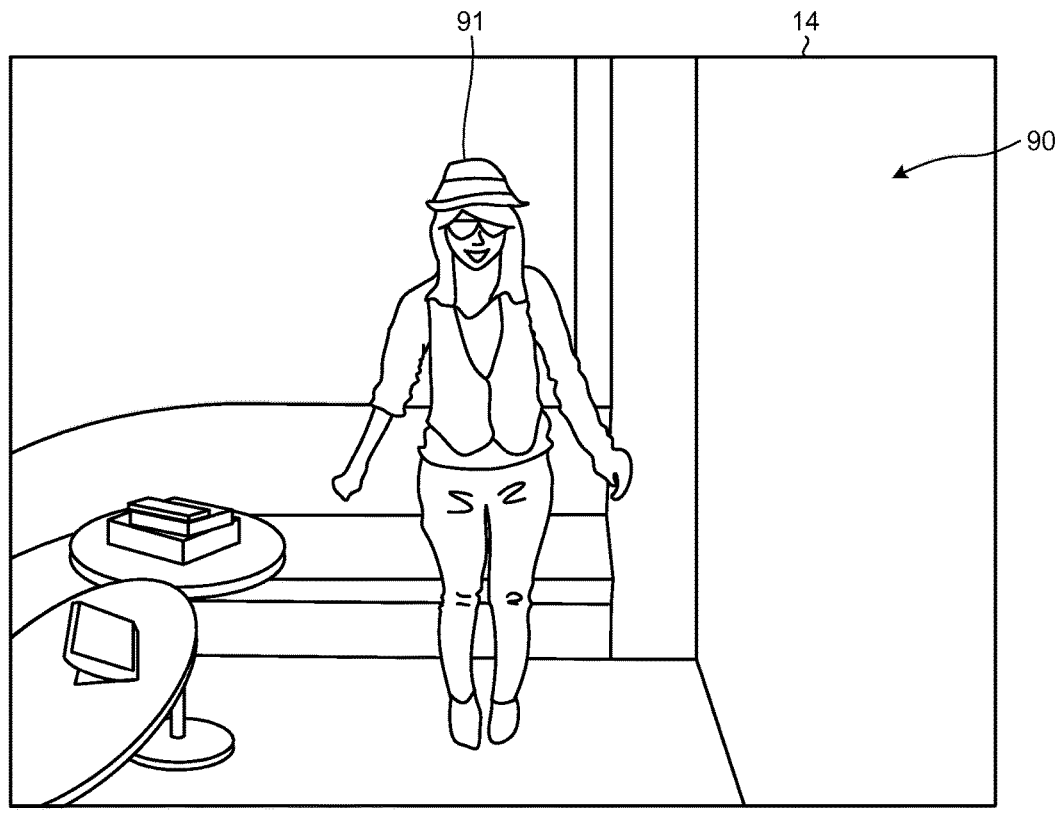
FIG. 2 is a drawing of an example of a frame.
FIG. 3 is a table of an example of timing data.

The moving image data 12a is data of moving images including a plurality of frames obtained as a result of taking images of the person who is dancing, by using a camera. The person may be, for example, a person who is singing a song to music played back by a karaoke apparatus and is dancing to the music played back, in an individual karaoke room. The plurality of frames included in the moving image data 12a were sequentially taken by the camera and serve as an example of the taken images. FIG. 2 is a drawing of an example of a frame. The example in FIG. 2 illustrates a situation where a frame 14 includes a person 91 who is singing a song and dancing to music, in an individual karaoke room 90. The frame rate of the moving image data 12a may be any arbitrary value. In the following sections, an example in which the frame rate is 30 frames per second (fps) will be explained.

The timing data 12b is data indicating the times (timing) at which the person who is dancing beats time. When the person included in the moving image data 12a is, for example, a person who is singing a song and dancing to music played back in an individual karaoke room, each of the times may be expressed as, for instance, a time period from the start of the music and dance, because the dance is started together with the music. FIG. 3 is a table of an example of the timing data. The timing data 12b illustrated in the example in FIG. 3 includes items such as "time" and "whether or not time is beaten". Under the item "time", time periods from the start of the music and dance are registered by an extracting unit 13c (explained later). Under the item "whether or not time is beaten", if the time registered under the item "time" corresponds to a time at which the person beats time, the extracting unit 13c (explained later) registers "Yes". On the contrary, if the time is not a time at which the person beats time, the extracting unit 13c registers "No". For example, in the first record in the timing data 12b illustrated in the example in FIG. 3, the time "0.033" seconds later than the start of the music and dance is indicated as a time at which the person beats time, because "Yes" is registered under the item "whether or not time is beaten". In contrast, in the second record in the timing data 12b illustrated in the example in FIG. 3, the time "0.066" seconds later than the start of the music and dance is indicated as not being a time at which the person beats time, because "No" is registered under the item "whether or not time is beaten".

The storage unit 12 is a storage device configured with, for example, a semiconductor memory element such as a flash memory, or a hard disk, an optical disk, or the like.

The controlling unit 13 has an internal memory for storing therein a computer program defining various types of processing procedures and control data and is configured to thereby execute various types of processes. As illustrated in FIG. 1, the controlling unit 13 includes an obtaining unit 13a, a detecting unit 13b, and the extracting unit 13c.

The obtaining unit 13a is configured to obtain, for each of the plurality of frames included in the moving images represented by the moving image data 12a, the difference between the frame and at least one frame taken prior to the frame. Further, the obtaining unit 13a is configured to obtain, for each of the plurality of frames included in the moving images represented by the moving image data 12a, the difference between the frame and a frame obtained by accumulating frames taken prior to the frame.

A mode of the obtaining unit 13a will be explained. For example, when the input unit 11 has input an instruction indicating that the extracting process (explained later) be performed, the obtaining unit 13a obtains the moving image data 12a stored in the storage unit 12.

After that, by implementing a background difference method, the obtaining unit 13a obtains, for each of the plurality of frames included in the moving images represented by the moving image data 12a, the difference between the frame and at least one frame taken prior to the frame. For example, by using a publicly-known function related to an accumulation of background statistic amounts, the obtaining unit 13a obtains, for each of the plurality of frames, the difference between the frame and the frame obtained by accumulating the frames taken prior to the frame.

Figures 4, 5:
FIG. 4 is a drawing of an example of a binarized image.
FIG. 5 is a table of an example of a correspondence relationship between background difference amounts and frame numbers.

A process that is performed when the obtaining unit 13a uses the function related to the accumulation of the background statistic amounts will be explained. The obtaining unit 13a compares the frame with background information obtained from the frames taken prior to the frame and generates a binarized image in which the pixels having a change in the brightness level that is equal to or smaller than a threshold value are expressed as black pixels, whereas the pixels having a change in the brightness level that is larger than the threshold value are expressed as white pixels. In this situation, the generated information does not necessarily have to be the binarized image using the black and white pixels, as long as it is possible to recognize from the information whether the changes in the brightness level are equal to or smaller than the threshold value or larger than the threshold value. FIG. 4 is a drawing of an example of the binarized image. For example, by using the function related to the accumulation of the background statistic amounts, the obtaining unit 13a compares the frame 14 in the abovementioned example in FIG. 2 with background information obtained from the frames taken prior to the frame 14 and generates the binarized image illustrated in FIG. 4. After that, the obtaining unit 13a calculates the total quantity of white pixels (a background difference amount) included in the generated binarized image, as a movement amount of the person. As explained here, according to the present embodiment, the background difference amount is used as an index indicating the amount of the movement of the person. For example, the obtaining unit 13a calculates the total quantity of white pixels included in the binarized image illustrated in FIG. 4, as the movement amount of the person 91. In this manner, the obtaining unit 13a obtains the background difference amount as the movement amount of the person, for each of the frames. After that, for each of the frames, the obtaining unit 13a brings the background difference amount into correspondence with the frame number. FIG. 5 is a table of an example of a correspondence relationship between the background difference amounts and frame numbers. The example in FIG. 5 illustrates a situation where the obtaining unit 13a has brought frame number "2" into correspondence with the background difference amount "267000". In addition, the example in FIG. 5 also illustrates a situation where the obtaining unit 13a has brought frame number "3" into correspondence with the background difference amount "266000". In this manner, for each of the plurality of frames, the obtaining unit 13a obtains the difference between the frame and the frame obtained by accumulating the frames taken prior to the frame.

Alternatively, the obtaining unit 13a may also implement a codebook method to obtain the difference between each of the frames and at least one frame taken prior to the frame, as well as to obtain the difference between each of the frames and the frame obtained by accumulating the frames taken prior to the frame.

Figure 6:
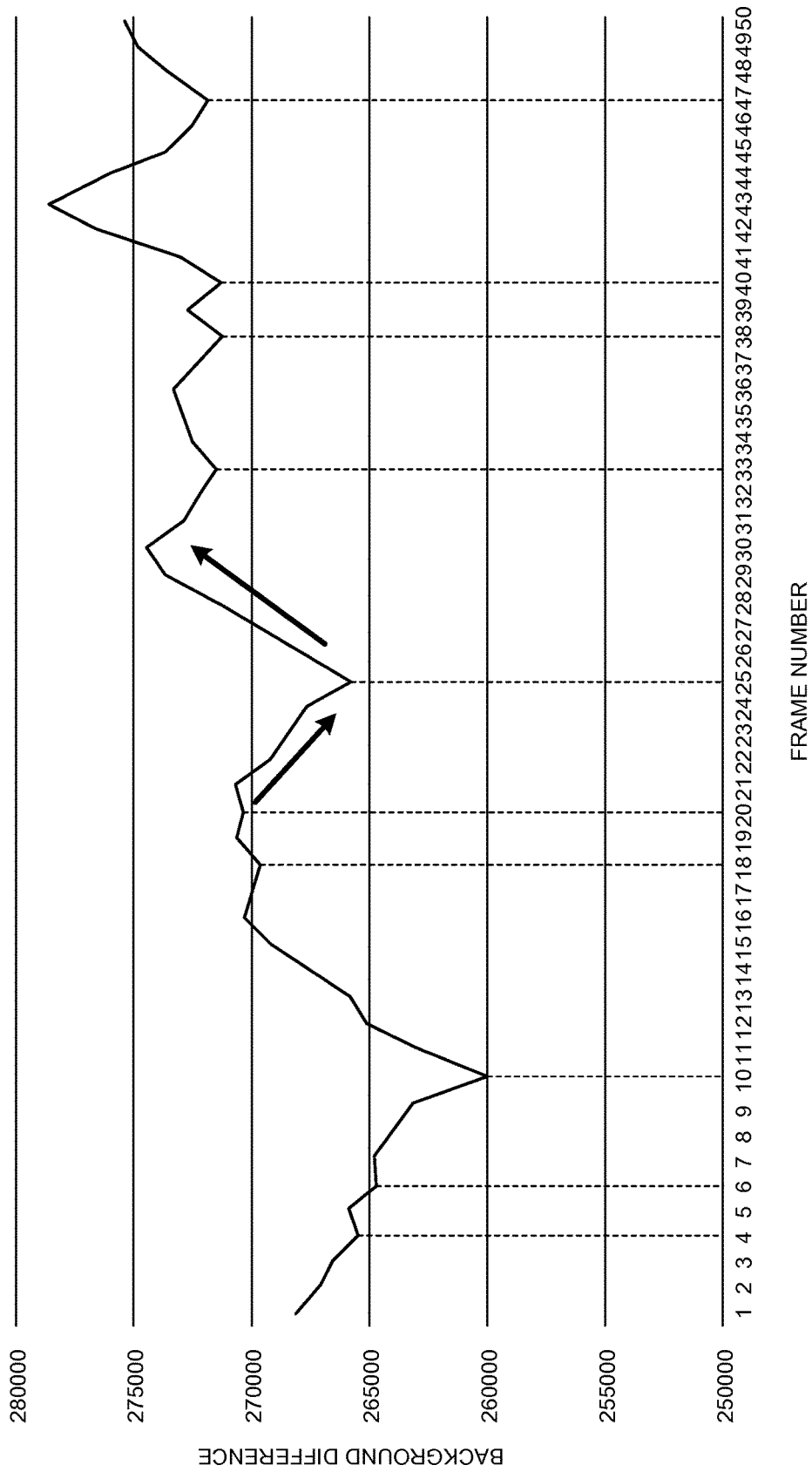
FIG. 6 is a chart for explaining an exemplary process performed by the detecting apparatus according to the present embodiment.

The detecting unit 13b detects the times at which the timelike change amount temporarily decreases in the plurality of frames that were sequentially taken. Next, a mode of the detecting unit 13b will be explained. For example, by using the information in which the frame numbers and the background difference amounts are kept in correspondence with one another by the obtaining unit 13a, the detecting unit 13b detects a frame of which the background difference amount is smaller than the background difference amount of the immediately preceding frame and of which the background difference amount is also smaller than the background difference amount of the immediately following frame. FIG. 6 is a chart for explaining an exemplary process performed by the detecting apparatus according to the present embodiment. The example in FIG. 6 illustrates a chart in which the horizontal axis expresses the frame numbers, whereas the vertical axis expresses the background difference amount and which indicates a relationship between the frame numbers and the background difference amounts that were brought into correspondence with one another by the obtaining unit 13a. The chart in FIG. 6 indicates the background difference amounts of the frames identified with frame numbers 1 through 50. As indicated in the chart in FIG. 6, when the obtaining unit 13a has brought the frame numbers and the background difference amounts into correspondence with one another, the detecting unit 13b performs the following processes: The detecting unit 13b detects the frame identified with frame number "4" of which the background difference amount is smaller than the background difference amount of the frame identified with frame number "3" and of which the background difference amount is also smaller than the background difference amount of the frame identified with frame number "5". Similarly, the detecting unit 13b detects the frames identified with frame numbers "6", "10", "18", "20", "25", "33", "38", "40", and "47".

After that, the detecting unit 13b detects the times at which the detected frames were taken, as the times at which the timelike change amount temporarily decreases in the plurality of frames. For example, the detecting unit 13b detects the times at which the frames identified with frame numbers "4", "6", "10", "18", "20", "25", "33", "38", "40", and "47" were taken, as the times at which the timelike change amount temporarily decreases in the plurality of frames.

On the basis of the times detected by the detecting unit 13b, the extracting unit 13c extracts either movements of beating time of the person included in the frames or the times at which the person in the frames beats time.

Next, a mode of the extracting unit 13c will be explained. For example, the extracting unit 13c extracts certain times from among the times detected by the detecting unit 13b in the following manner: The extracting unit 13c extracts frames satisfying a predetermined condition from among the frames taken at the times detected by the detecting unit 13b and further extracts the times at which the extracted frames were taken as the times at which the person included in the frames beats time.

Next, an example of a method by which the extracting unit 13c extracts the frames satisfying the predetermined condition will be explained. For example, the extracting unit 13c selects one by one out of the frames corresponding to the times detected by the detecting unit 13b (i.e., one of the frames taken at the detected times), as an extraction candidate frame. After that, the extracting unit 13c performs the following process, every time one extraction candidate frame is extracted: The extracting unit 13c judges whether the background difference amounts keep decreasing from a frame earlier than the extraction candidate frame by a predetermined quantity of frames to the extraction candidate frame, and also, keep increasing from the extraction candidate frame to a frame later than the extraction candidate frame by a predetermined quantity of frames. If the extracting unit 13c has determined that the background difference amounts keep decreasing from the frame earlier than the extraction candidate frame by the predetermined quantity of frames to the extraction candidate frame, and also, keep increasing from the extraction candidate frame to the frame later than the extraction candidate frame by the predetermined quantity of frames, the extracting unit 13c performs the following process: The extracting unit 13c extracts the time at which the extraction candidate frame was taken, as a time at which the person included in the frame beats time. In other words, the extracting unit 13c extracts a movement of beating time of the person included in the extraction candidate frame, from among movements of the person represented in the plurality of frames. After that, the extracting unit 13c performs the process described above, on each of all the frames corresponding to the times detected by the detecting unit 13b.

For example, a situation will be explained in which the predetermined quantity of frames is "4", and the frame numbers and the background difference amounts have been brought into correspondence with one another by the obtaining unit 13a as illustrated in the chart in FIG. 6. In that situation, because the background difference amounts keep decreasing from the frame identified with frame number "21" to the frame identified with frame number "25", and also, keep increasing from the frame identified with frame number "25" to the frame identified with frame number "9", the extracting unit 13c performs the following process: The extracting unit 13c extracts the time at which the frame identified with frame number "5" was taken, as the time at which the person included in the frame beats time. Further, the extracting unit 13c extracts a movement of beating time of the person included in the frame identified with frame number "25", from among the movements of the person represented by the plurality of frames. The predetermined quantity of frames described above may be set to mutuallydifferent values for the frame earlier than the extraction candidate frame and for the frame later than the extraction candidate frame. For example, it is possible to use a mode in which the predetermined quantity of frames by which the frame is earlier than the extraction candidate frame is "5", whereas the predetermined quantity of frames by which the frame is later than the extraction candidate frame is "1".

After that, from among the times at which the plurality of frames were taken, the extracting unit 13c registers the times at which the person beats time and "Yes" into the timing data 12b illustrated in FIG. 3, so as to be kept in correspondence with one another. Further, from among the times at which the plurality of frames were taken, the extracting unit 13c registers the times at which the person does not beat time and "No" into the timing data 12b illustrated in FIG. 3, so as to be kept in correspondence with one another. The timing data 12b in which the various types of information have been registered in this manner will be used, for example, for evaluating the person's rhythm indicated by the times at which the person beats time.

Figure 7:
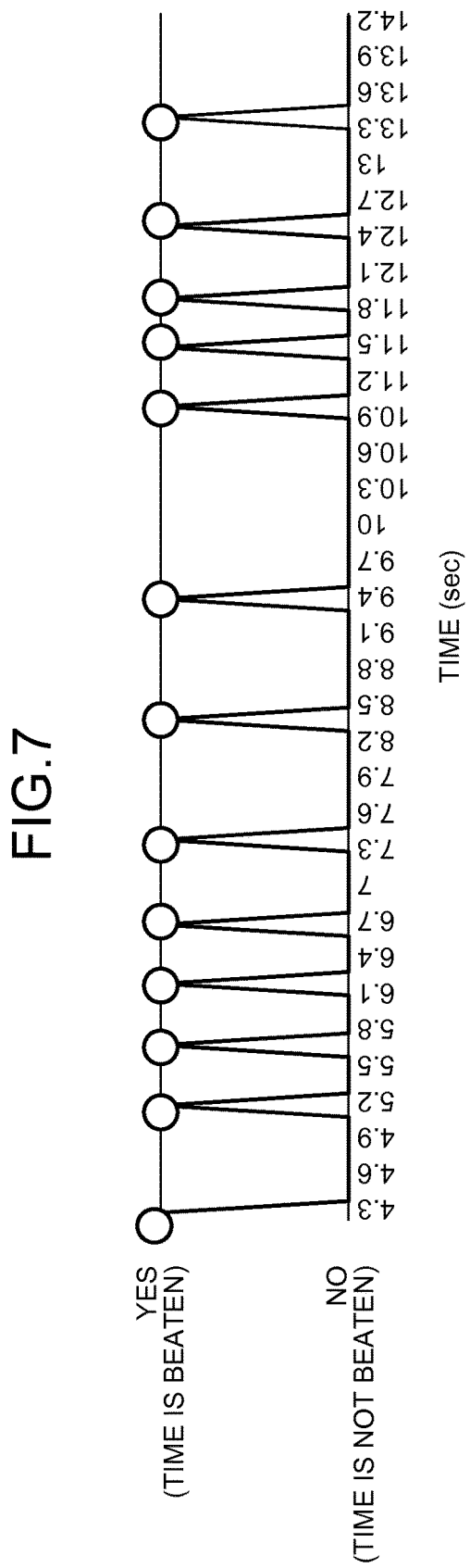
FIG. 7 is a drawing of an example of a chart obtained by plotting times at which a person beats time and which are represented by timing data.

FIG. 7 is a drawing of an example of a chart obtained by plotting the times at which the person beats time and which are represented by the timing data. In FIG. 7, the horizontal axis expresses time (seconds), whereas the vertical axis expresses whether the person beats time or not. In the example in FIG. 7, whether or not the person beats time at the time is plotted, while using time intervals of 0.3 seconds. For instance, in the example in FIG. 7, for each set made up of nine consecutive frames, if the times at which the nine frames were taken include a time at which the person beats time, a dot is plotted in the position indicating "Yes". On the contrary, if the times at which the nine frames were taken include no time at which the person beats time, no dot is plotted. In the example in FIG. 7, for instance, a dot is plotted in the position indicating "Yes", in correspondence with the time "4.3 seconds". It means that the nine frames corresponding to the times at the time intervals of ⅟₃₀ seconds from 4.0 seconds to 4.3 seconds include a time at which the person beats time. Further, in the example in FIG. 7, for instance, no dot is plotted in correspondence with the time "4.6 seconds". It means that the nine frames corresponding to the times at the time intervals of ⅟₃₀ seconds from 4.3 seconds to 4.6 seconds include no time at which the person beats time. The same applies to the other times. FIG. 7 only illustrates a conceptual example of the timing data, and it is possible to use any other modes besides the one illustrated in FIG. 7.

For example, the controlling unit 13 may be realized with a circuit such as an Application Specific Integrated Circuit (ASIC), a Field Programmable Gate Array (FPGA), a Central Processing Unit (CPU), a Micro Processing Unit (MPU), or the like.

A Flow in a Process

Figure 8:
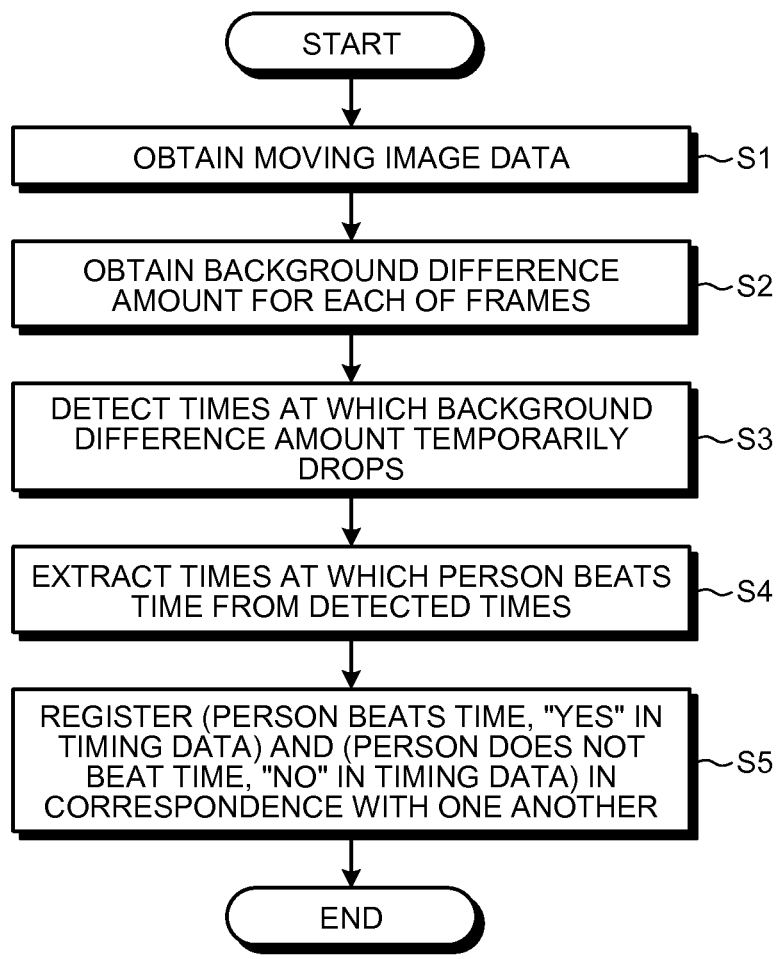
FIG. 8 is a flowchart of a procedure in a detecting process according to the present embodiment.

Next, a flow in a process performed by the detecting apparatus 10 according to the present embodiment will be explained. FIG. 8 is a flowchart of a procedure in the detecting process according to the present embodiment. The detecting process according to the present embodiment is performed by the controlling unit 13 when, for example, the input unit 11 has input an instruction indicating that the detecting process be performed to the controlling unit 13.

As illustrated in FIG. 8, the obtaining unit 13a obtains the moving image data 12a stored in the storage unit 12 (step S1). After that, for each of the plurality of frames, the obtaining unit 13a obtains the background difference amount as a movement amount of the person and brings the background difference amounts into correspondence with the frame numbers (step S2).

Subsequently, the detecting unit 13b detects times at which a timelike change amount temporarily decreases in the plurality of frames that were sequentially taken (step S3). After that, on the basis of the times detected by the detecting unit 13b, the extracting unit 13c extracts either the movements of beating time of the person included in the frames or the time at which the person included in the frames beats time (step S4).

After that, from among the times at which the plurality of frames were taken, the extracting unit 13c registers the times at which the person beats time, and "Yes" into the timing data 12b illustrated in FIG. 3, so as to be kept in correspondence with one another. Further, from among the times at which the plurality of frames were taken, the extracting unit 13c registers the times at which the person does not beat time and "No" into the timing data 12b illustrated in FIG. 3, so as to be kept in correspondence with one another (step S5). Subsequently, the extracting unit 13c ends the detecting process.

As explained above, the detecting apparatus 10 detects the times at which the timelike change amount temporarily decreases in the plurality of frames that were sequentially taken. After that, on the basis of the detected times, the detecting apparatus 10 extracts either the movements of beating time of the person included in the frames or the times at which the person included in the frames beats time. Accordingly, the detecting apparatus 10 is able to extract the times at which the person beats time, without performing any recognition process for recognizing the face or a part of the body of the person or a tool, i.e., without performing any recognition process that involves a large amount of processing. Consequently, by using the detecting apparatus 10, it is possible to easily extract the times at which the person beats time. Further, when the method according to the present embodiment described above is used, for example, in the mode in which the detecting process is performed by comparing the person's movements with the reference movement, it is possible to extract the person's movements of beating time or the times at which the person beats time, even if the movements are of a such type that it is not possible to extract the times thereof because the movements do not match the reference movement. Consequently, it is possible to extract the person's movements of beating time or the times at which the person beats time, even in the situation where the person makes the movements without keeping a reference movement in mind.

Further, by using the function related to the accumulation of the background statistic amounts, the detecting apparatus 10 obtains, for each of the plurality of frames, the background difference amount between the frame and the frame obtained by accumulating the frames taken prior to the frame. By using the function related to the accumulation of the background statistic amounts in this manner, the detecting apparatus 10 is able to obtain the background difference amounts in which noise is suppressed, the noise being caused by light from the lighting in the room or reflected light on a monitor screen connected to the karaoke apparatus. Consequently, the detecting apparatus 10 is able to extract the times at which the person beats time with a high level of precision, even if the processing is performed on the moving image data taken in the individual karaoke room that has the lighting and the monitor screen provided therewith.

Exemplary embodiments of the disclosed apparatus have thus been explained. It is, however, possible to carry out the present disclosure in other various modes besides the exemplary embodiments described above.

When having determined that the background difference amounts keep decreasing from the frame earlier than the extraction candidate frame by the predetermined quantity of frames to the extraction candidate frame, and also, keep increasing from the extraction candidate frame to the frame later than the extraction candidate frame by the predetermined quantity of frames, the extracting unit 13c may perform the following process: The extracting unit 13c judges whether a difference α between the background difference amount of the frame earlier than the extraction candidate frame by the predetermined quantity of frames and the background difference amount of the extraction candidate frame is equal to or larger than a first threshold value. If the difference α is determined to be equal to or larger than the first threshold value, the extracting unit 13c further judges whether a difference β between the background difference amount of the frame later than the extraction candidate frame by the predetermined quantity of frames and the background difference amount of the extraction candidate frame is equal to or larger than a second threshold value. If the difference β is determined to be equal to or larger than the second threshold value, the extracting unit 13c extracts the time at which the extraction candidate frame was taken, as a time at which the person included in the frame beats time. In other words, the extracting unit 13c extracts the movement of beating time of the person included in the extraction candidate frame, from among the movements of the person represented by the plurality of frames. After that, the extracting unit 13c performs the process described above on each of all the frames corresponding to the times detected by the detecting unit 13b. In this situation, the first threshold value and the second threshold value may be the same as each other or may be different from each other. Further, another mode is also possible in which only one of the first and the second threshold values is set.

Figure 9:
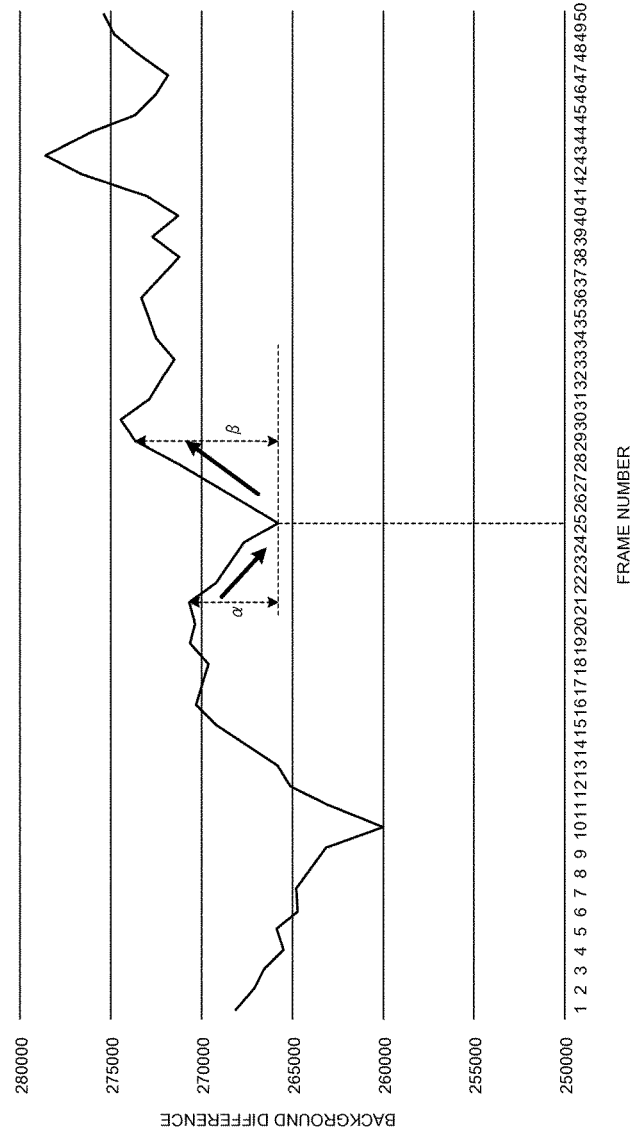
FIG. 9 is a chart for explaining an example in which times at which a person beats time are extracted.

FIG. 9 is a chart for explaining the other example above in which the times at which the person beats time are extracted. FIG. 9 illustrates an example in which the predetermined quantity of frames is "4", and the extracting unit 13c has determined that the background difference amounts keep decreasing from the frame identified with frame number "21" to the extraction candidate frame, and also, keep increasing from the extraction candidate frame to the frame identified with frame number "29". In the present example, the extraction candidate frame is the frame identified with frame number "25". In this situation, the extracting unit 13c judges whether the difference α between the background difference amount of the frame identified with frame number "21" and the background difference amount of the extraction candidate frame is equal to or larger than the first threshold value. If the difference α is determined to be equal to or larger than the first threshold value, the extracting unit 13c further judges whether the difference β between the background difference amount of the frame identified with frame number "29" and the background difference amount of the extraction candidate frame is equal to or larger than the second threshold value. If the difference β is determined to be equal to or larger than the second threshold value, the extracting unit 13c extracts the time at which the extraction candidate frame was taken, as a time at which the person included in the frame beats time. In other words, it also means that the extracting unit 13c has extracted the movement of beating time of the person included in the extraction candidate frame, from among the movements of the person represented by the plurality of frames. As a result, it is possible to extract the times at which the person beats time with a high level of precision, by avoiding the situation where a detection result is erroneously extracted as a time at which the person beats time, for example, when the person temporarily had a slow movement of the body, which is actually not a movement of beating time.

Figure 10:
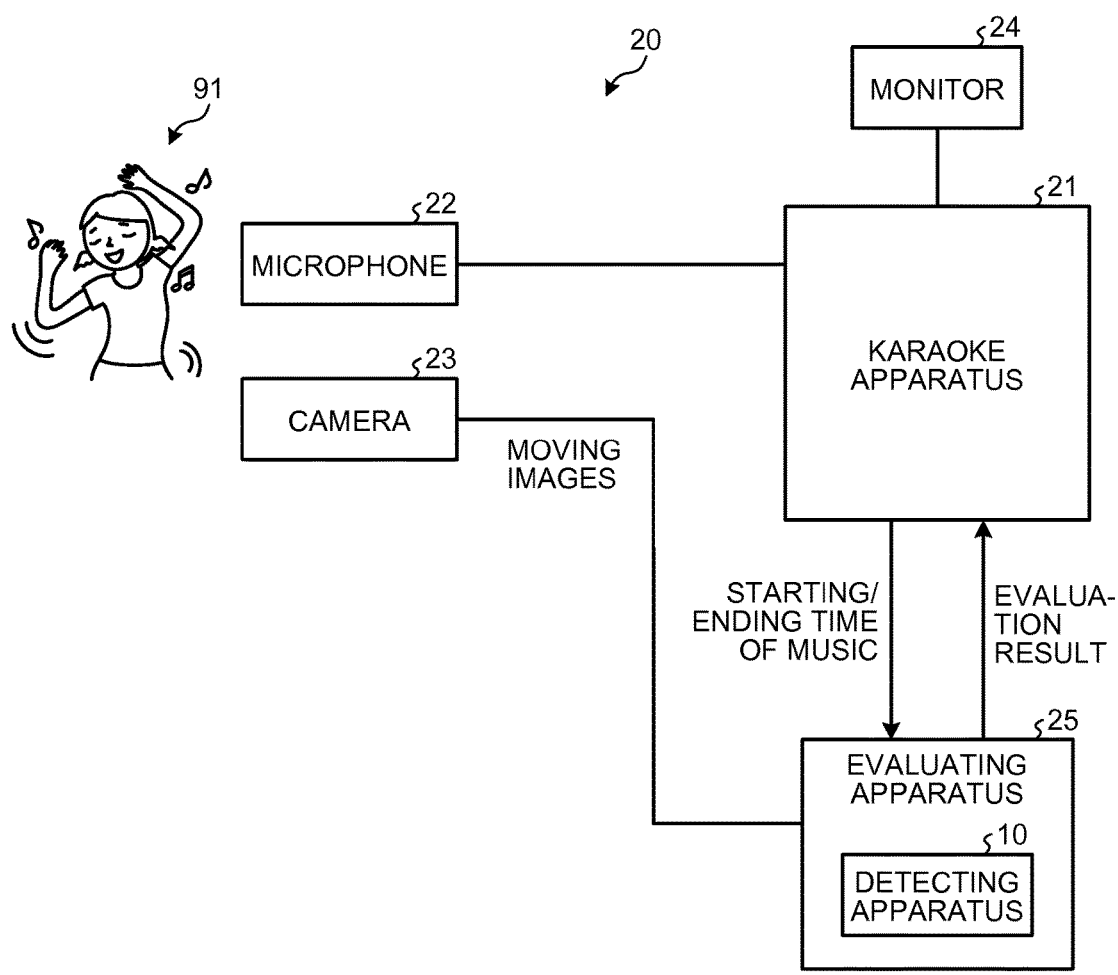
FIG. 10 is a drawing of an exemplary system in which a detecting apparatus and a karaoke apparatus operate in collaboration with each other.

Further, the detecting apparatus 10 is also able to extract a rhythm of a person in a real-time manner, in collaboration with a karaoke apparatus provided in an individual karaoke room. In this situation, the "real-time manner" includes, for example, a mode in which the processing is sequentially performed on the input frames so as to sequentially output the processing results. FIG. 10 is a drawing of an exemplary system in which the detecting apparatus and a karaoke apparatus operate in collaboration with each other. A system 20 illustrated in FIG. 10 includes a karaoke apparatus 21, a microphone 22, a camera 23, a monitor 24, and an evaluating apparatus 25. The karaoke apparatus 21 plays back a song specified by the person 91 and outputs the music from a speaker (not illustrated), for the person 91 performing to the karaoke music. As a result, the person 91 is able to sing to the music played back while using the microphone 22 and to dance to the music. Further, the karaoke apparatus 21 sends a message to the evaluating apparatus 25 indicating the starting time of the playback of the music, at the time when the playback of the music is started. Further, the karaoke apparatus 21 also sends a message to the evaluating apparatus 25 indicating the ending time of the playback of the music, at the time when the playback of the music is ended.

The evaluating apparatus 25 includes the detecting apparatus 10. When the evaluating apparatus 25 has received the message indicating that it is time for the playback of the music to be started, the detecting apparatus 10 transmits an instruction to the camera 23 indicating that an image taking process be started. When having received the instruction to start the image taking process, the camera 23 starts taking images of the person 91 who is present in an image taking area and sequentially transmits the frames of the moving image data 12a obtained from the image taking process to the detecting apparatus 10 included in the evaluating apparatus 25.

When having received the frames transmitted from the camera 23, the detecting apparatus 10 applies the various types of processing processes described above to the received frames in a real-time manner, extracts the times at which the person 91 beats time, and registers the various types of information into the timing data 12b. After that, the evaluating apparatus 25 evaluates the dance of the person 91, by comparing the rhythm indicated by the times at which the person 91 beats time and which were registered into the timing data 12b, with the rhythm of the music played back, and transmits an evaluation result to the karaoke apparatus 21.

When having received the evaluation result, the karaoke apparatus 21 causes the monitor 24 to display the received evaluation result. Accordingly, the person 91 is able to understand the evaluation result in a real-time manner.

After that, when having received the message from the karaoke apparatus 21 indicating that it is time for the playback of the music to be ended, the evaluating apparatus 25 transmits an instruction to the camera 23 indicating that the image taking process be stopped. When having received the instruction indicating that the image processing be stopped, the camera 23 stops the image taking process.

As explained above, in the system 20, the detecting apparatus 10 is able to extract the rhythm of the person in a real-time manner, in collaboration with the karaoke apparatus 21 provided in the individual karaoke room. Further, the evaluating apparatus 25 is able to evaluate the dance of the person in a real-time manner.

Figure 11:
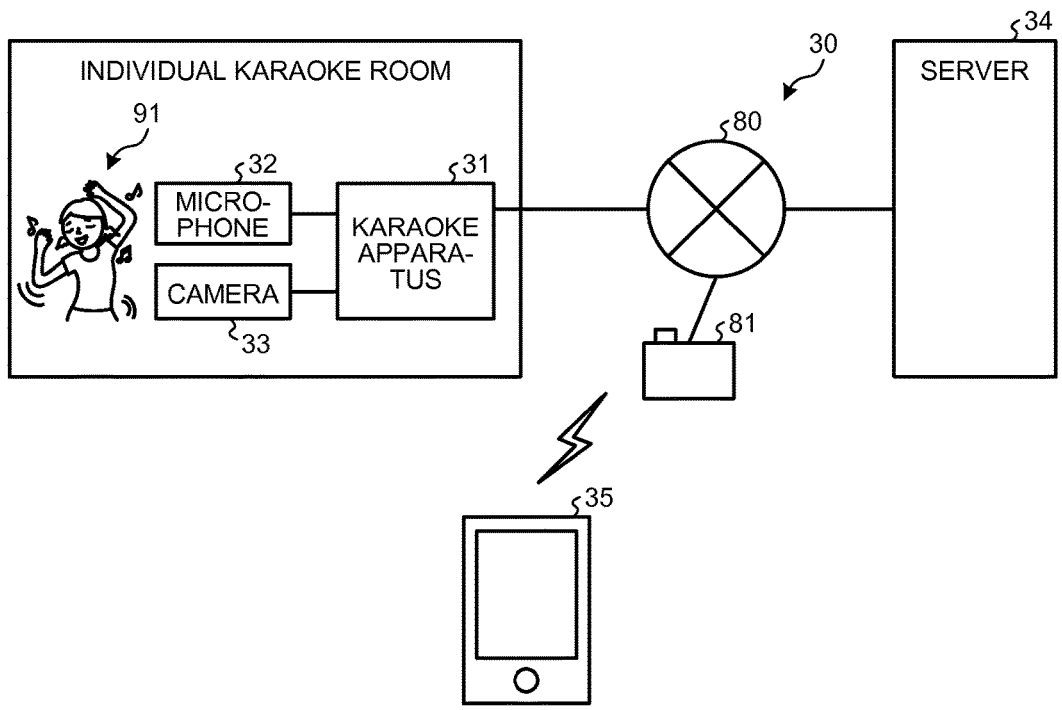
FIG. 11 is a diagram of an example of a system including a server.

Further, it is also possible to configure a server provided on the outside of the individual karaoke room to have the same functions as the various types of functions of the detecting apparatus 10, so that the server is able to extract the rhythm of the person and to evaluate the dance of the person in a real-time manner. FIG. 11 is a diagram of an example of a system including a server. A system 30 illustrated in the example in FIG. 11 includes a karaoke apparatus 31, microphone 32, a camera 33, a server 34, and a portable terminal 35. The karaoke apparatus 31 plays back a song specified by the person 91 and outputs the music from a speaker (not illustrated), for the person 91 performing to the karaoke music. As a result, the person 91 is able to sing to the music played back while using the microphone 32 and to dance to the music. Further, the karaoke apparatus 31 transmits an instruction to the camera 33 indicating that an image taking process be started, at the time when the playback of the music is started. Further, the karaoke apparatus 31 transmits an instruction to the camera 33 indicating that the image taking process be stopped, at the time when the playback of the music is ended.

When having received the instruction to start the image taking process, the camera 33 starts taking images of the person 91 who is present in an image taking area and sequentially transmits the frames of the moving image data 12a obtained from the image taking process to the karaoke apparatus 31. When having received the frames transmitted from the camera 33, the karaoke apparatus 31 sequentially transmits the received frames to the server 34 via a network 80 and sequentially transmits audio data of the person 91 input to the microphone 32 to the server 34 via the network 80.

The server 34 applies the same processes as the various types of processing processes performed by the detecting apparatus 10 described above to the frames transmitted from the karaoke apparatus 31 in a real-time manner, extracts the times at which the person 91 beats time, and registers the various types of information into the timing data 12b. After that, the server 34 evaluates the dance of the person 91, by comparing the rhythm indicated by the times at which the person 91 beats time and which were registered into the timing data 12b, with the rhythm of the music based on the audio data transmitted from the karaoke apparatus 31. After that, the server 34 transmits an evaluation result to the portable terminal 35 which the person 91 has, via the network 80 and a base station 81.

When having received the evaluation result, the portable terminal 35 causes a display screen of the portable terminal 35 to display the received evaluation result. As a result, the person 91 is able to understand the evaluation result, in a real-time manner. Further, the person 91 is able to understand the evaluation result from the portable terminal 35 which the person 91 has.

In another example, the server 34 may obtain the moving image data 12a from the karaoke apparatus 31 in a non-real-time manner, apply thereto the same processes as the various types of processing processes performed by the detecting apparatus 10, extract the times at which the person 91 beats time, and register the various types of information into the timing data 12b. In that situation, the server 34 evaluates the dance of the person 91, by comparing the rhythm indicated by the times at which the person 91 beats time and which were registered into the timing data 12b, with the rhythm of the music based on the audio data transmitted from the karaoke apparatus 31. After that, the server 34 transmits an evaluation result to the portable terminal 35 which the person 91 has, via the network 80 and the base station 81.

Further, the detecting unit 13b and the extracting unit 13c may perform the processes described below. The detecting unit 13b selects one by one out of the plurality of frames, as a detection candidate frame. After that, the detecting unit 13b performs the following process, every time one detection candidate frame is selected: The detecting unit 13b judges whether the background difference amounts keep decreasing from a frame earlier than the detection candidate frame by a predetermined quantity of frames to the detection candidate frame, and also, keep increasing from the detection candidate frame to a frame later than the detection candidate frame by a predetermined quantity of frames. If the detecting unit 13b has determined that the background difference amounts keep decreasing from the frame earlier than the detection candidate frame by the predetermined quantity of frames to the detection candidate frame, and also, keep increasing from the detection candidate frame to the frame later than the detection candidate frame by the predetermined quantity of frames, the detecting unit 13b performs the following process: The detecting unit 13b detects the time at which the detection candidate frame was taken. After that, the detecting unit 13b performs the process described above on each of all the frames. Subsequently, the extracting unit 13c extracts the times detected by the detecting unit 13b from among the times at which the plurality of frames were taken, as the times at which the person beats time. In other words, the extracting unit 13c extracts the person's movements of beating time, from the person's movements represented by the plurality of frames.

The processes at the steps in the processing explained in the exemplary embodiments may arbitrarily be divided into sections or may arbitrarily be combined together, depending on various types of loads or the status of use. Further, one or more of the steps may be omitted.

Furthermore, the order in which the processes at the steps in the processing explained in the exemplary embodiments are performed may be altered, depending on various types of loads or the status of use.

The constituent elements of the apparatuses illustrated in the drawings are based on functional concepts. Thus, it is not necessary to physically configure the constituent elements as indicated in the drawings. In other words, the specific modes of distribution and integration of the apparatuses are not limited to the ones illustrated in the drawings. It is acceptable to functionally or physically distribute or integrate all or a part of the apparatuses in any arbitrary units, depending on various loads and the status of use. For example, the camera 23 described in the exemplary embodiment may be connected to the karaoke apparatus 21 so as to be able to communicate with the evaluating apparatus 25 via the karaoke apparatus 21. As another example, the functions of the karaoke apparatus 21 and the evaluating apparatus 25 described in the exemplary embodiment may be realized by a single computer.

A Detection Program

Figure 12:
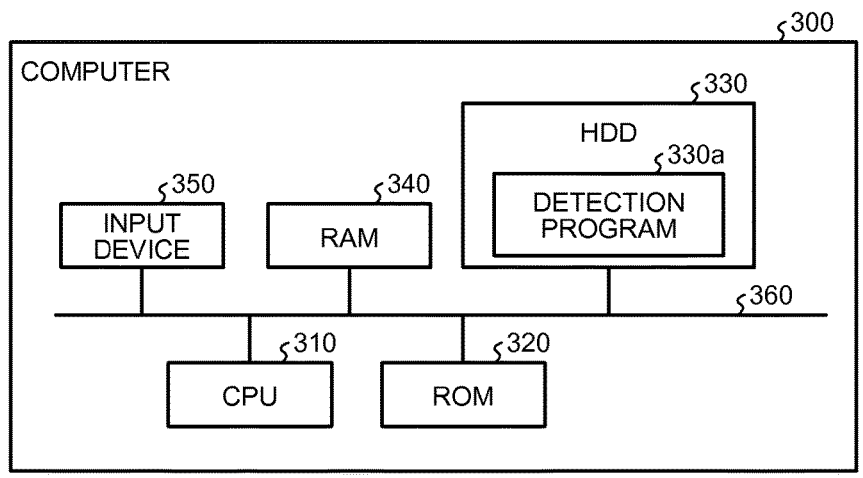
FIG. 12 is a diagram of a computer that executes a detection program.

The various types of processes performed by the detecting apparatus 10 described in the exemplary embodiments above may be realized by causing a computer system such as a personal computer or a workstation to execute a program prepared in advance. In this regard, an example of a computer that executes a detection program having the same functions as those of the detecting apparatus 10 described in the exemplary embodiments above will be explained below, with reference to FIG. 12. FIG. 12 is a diagram of the computer that executes the detection program.

As illustrated in FIG. 12, a computer 300 includes a CPU 310, a Read-Only Memory (ROM) 320, a Hard Disk Drive (HDD) 330, a Random Access Memory (RAM) 340, and an input device 350. These devices 310 to 350 are connected to one another via a bus 360.

The ROM 320 stores therein a basic program such as an Operating System (OS). Further, the HDD 330 has stored therein, in advance, a detection program 330a that achieves the same functions as those of the obtaining unit 13a, the detecting unit 13b, and the extracting unit 13c described in the exemplary embodiments above. Further, the HDD 330 has stored therein, in advance, the moving image data 12a and the timing data 12b.

The CPU 310 reads and executes the detection program 330a from the HDD 330. The CPU 310 reads the moving image data 12a and the timing data 12b from the HDD 330 and stores the read data into the RAM 340. Further, by using the various types of data stored in the RAM 340, the CPU 310 executes the detection program 330a. As for the data stored in the RAM 340, not all the pieces of data have to be stored in the RAM 340 at all times. It is sufficient if pieces of data used in each process are stored in the RAM 340.

The detection program 330a described above does not necessarily have to be stored in the HDD 330 from the beginning. For example, the detection program 330a may be stored in a "portable physical medium" that can be inserted into the computer 300, such as a flexible disk (FD), a Compact Disk Read-Only Memory (CD-ROM), a Digital Versatile Disk (DVD), a magneto-optical disk, an Integrated Circuit (IC) card, or the like. In that situation, the computer 300 may read and execute the detection program 330a from any of these media.

Another arrangement is also acceptable in which the detection program 330a is stored in "another computer (or a server)" or the like that is connected to the computer 300 via a public communication line, the Internet, a Local Area Network (LAN), a Wide Area Network (WAN), or the like. In that situation, the computer 300 may read and execute the detection program 330a through any of these connections.

According to at least one aspect of the present disclosure, it is possible to extract the person's movements of beating time or the times at which the person beats time, on the basis of the taken images.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium that stores therein a detection program that causes a computer to execute a process comprising:

obtaining, for each of a plurality of taken images that are sequentially taken, a difference between a taken image and at least one taken image taken prior to the taken image;

detecting times at which a change amount temporarily decreases in the plurality of images, on a basis of a result of comparing differences between the plurality of taken images obtained at the obtaining; and extracting a time at which a person beats rhythm from the detected times at the detecting, when difference amounts obtained at the obtaining keep decreasing from an image taken earlier than the image at the detected time by a predetermined quantity of images prior to the image at the detected time, and keep increasing from the image at the detected time subsequent to an image taken later than the image at the detected time by a predetermined quantity of images.

2. The non-transitory computer-readable recording medium according to claim 1, wherein the obtaining obtains, for each of the plurality of taken images, a difference between the taken image and an image obtained by accumulating taken images taken prior to the taken image.

3. The non-transitory computer-readable recording medium according to claim 1, wherein the detecting detects the times at which the change amount temporarily decreases such as a time at which an image having a smaller difference amount is taken, compared to other images taken at image taking times before and after a predetermined time.

4. A detecting method by which a computer executes a process comprising:

obtaining, using a processor, for each of a plurality of taken images that are sequentially taken, a difference between a taken image and at least one taken image taken prior to the taken image;

detecting, using a processor, times at which a change amount temporarily decreases in the plurality of images, on a basis of a result of comparing differences between the plurality of taken images obtained at the obtaining; and extracting, using a processor, a time at which a person beats rhythm from the detected times at the detecting, when difference amounts obtained at the obtaining keep decreasing from an image taken earlier than the image at the detected time by a predetermined quantity of images prior to the image at the detected time, and keep increasing from the image at the detected time subsequent to an image taken later than the image at the detected time by a predetermined quantity of images.

5. A detecting apparatus comprising:

a processor, wherein the processor executes a process comprising:

obtaining for each of a plurality of taken images that are sequentially taken, a difference between a taken image and at least one taken image taken prior to the taken image;

detecting times at which a change amount temporarily decreases in the plurality of images, on a basis of a result of comparing differences between the plurality of taken images obtained at the obtaining; and extracting a time at which a person beats rhythm from the detected times at the detecting, when difference amounts obtained at the obtaining keep decreasing from an image taken earlier than the image at the detected time by a predetermined quantity of images prior to the image at the detected time, and keep increasing from the image at the detected time subsequent to an image taken later than the image at the detected time by a predetermined quantity of images.

\* \* \* \* \*